US010011017B2

(12) United States Patent
Matsudaira et al.

(10) Patent No.: US 10,011,017 B2
(45) Date of Patent: Jul. 3, 2018

(54) INDUSTRIAL ROBOT SYSTEM AND CONTROL METHOD THEREOF

(71) Applicant: FANUC CORPORATION, Yamanashi (JP)

(72) Inventors: Tetsuro Matsudaira, Yamanashi (JP); Shuntaro Toda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 9 days.

(21) Appl. No.: 15/188,989

(22) Filed: Jun. 22, 2016

(65) Prior Publication Data

US 2017/0028565 A1   Feb. 2, 2017

(30) Foreign Application Priority Data

Jul. 30, 2015 (JP) .................. 2015-151238

(51) Int. Cl.
*G06F 19/00* (2018.01)
*B25J 13/08* (2006.01)
*B25J 9/16* (2006.01)
*B25J 19/06* (2006.01)

(52) U.S. Cl.
CPC ........... *B25J 13/085* (2013.01); *B25J 9/1674* (2013.01); *B25J 19/06* (2013.01); *G05B 2219/40201* (2013.01); *G05B 2219/40202* (2013.01)

(58) Field of Classification Search
CPC ........ B25J 13/085; B25J 9/1674; B25J 19/06; G05B 2219/40201; G05B 2219/40202

USPC .................................. 700/245, 253
See application file for complete search history.

(56) References Cited

U.S. PATENT DOCUMENTS

| 9,351,900 | B2* | 5/2016 | Walsh | A61H 1/024 |
|---|---|---|---|---|
| 9,592,608 | B1* | 3/2017 | Bingham | B25J 9/1674 |
| 9,694,497 | B2* | 7/2017 | Burmeister | B25J 9/1676 |
| 9,702,349 | B2* | 7/2017 | Anderson | F03G 7/08 |
| 9,718,187 | B2* | 8/2017 | Ishikawa | B25J 9/1674 |
| 9,724,827 | B2* | 8/2017 | Ueberle | B25J 9/1674 |
| 2010/0087955 | A1* | 4/2010 | Tsusaka | B25J 9/0003 700/245 |
| 2011/0301753 | A1* | 12/2011 | Bonin | B25J 9/1674 700/245 |
| 2014/0005827 | A1* | 1/2014 | Ogawa | B25J 9/1674 700/250 |

(Continued)

FOREIGN PATENT DOCUMENTS

| JP | 2000-84871 A | 3/2000 |
|---|---|---|
| JP | 2000-153475 A | 6/2000 |
| JP | 2001-113481 A | 4/2001 |

(Continued)

*Primary Examiner* — Ronnie Mancho
(74) *Attorney, Agent, or Firm* — Hauptman Ham, LLP

(57) ABSTRACT

An industrial robot system includes a first deviation calculation unit calculating a first deviation between a first force detection value and a first force estimation value, a first command output unit outputting an operation command, a stop command, a deceleration command, or a deceleration stop command to a robot when a first deviation is larger than a first threshold value, and a fourth command output unit outputting the operation command, the stop command, the deceleration command, or the deceleration stop command according to a deviation pattern when the first deviation includes a common deviation pattern.

10 Claims, 7 Drawing Sheets

(56) References Cited

U.S. PATENT DOCUMENTS

2015/0081093 A1* 3/2015 Ogoh .................... B25J 9/16
              700/245
2015/0112480 A1* 4/2015 Nakata .................. B25J 19/06
              700/245

FOREIGN PATENT DOCUMENTS

| JP | 2006-21287 A | 1/2006 |
| JP | 2007-301691 A | 11/2007 |
| JP | 2008-200764 A | 9/2008 |
| JP | 2010-188504 A | 9/2010 |
| JP | 2010-269375 A | 12/2010 |
| JP | 2012-218094 A | 11/2012 |
| JP | 2014-505934 A | 3/2014 |
| WO | 2013/018205 A1 | 2/2013 |
| WO | 2014/036549 A2 | 3/2014 |
| WO | 2014/129110 A1 | 8/2014 |

* cited by examiner

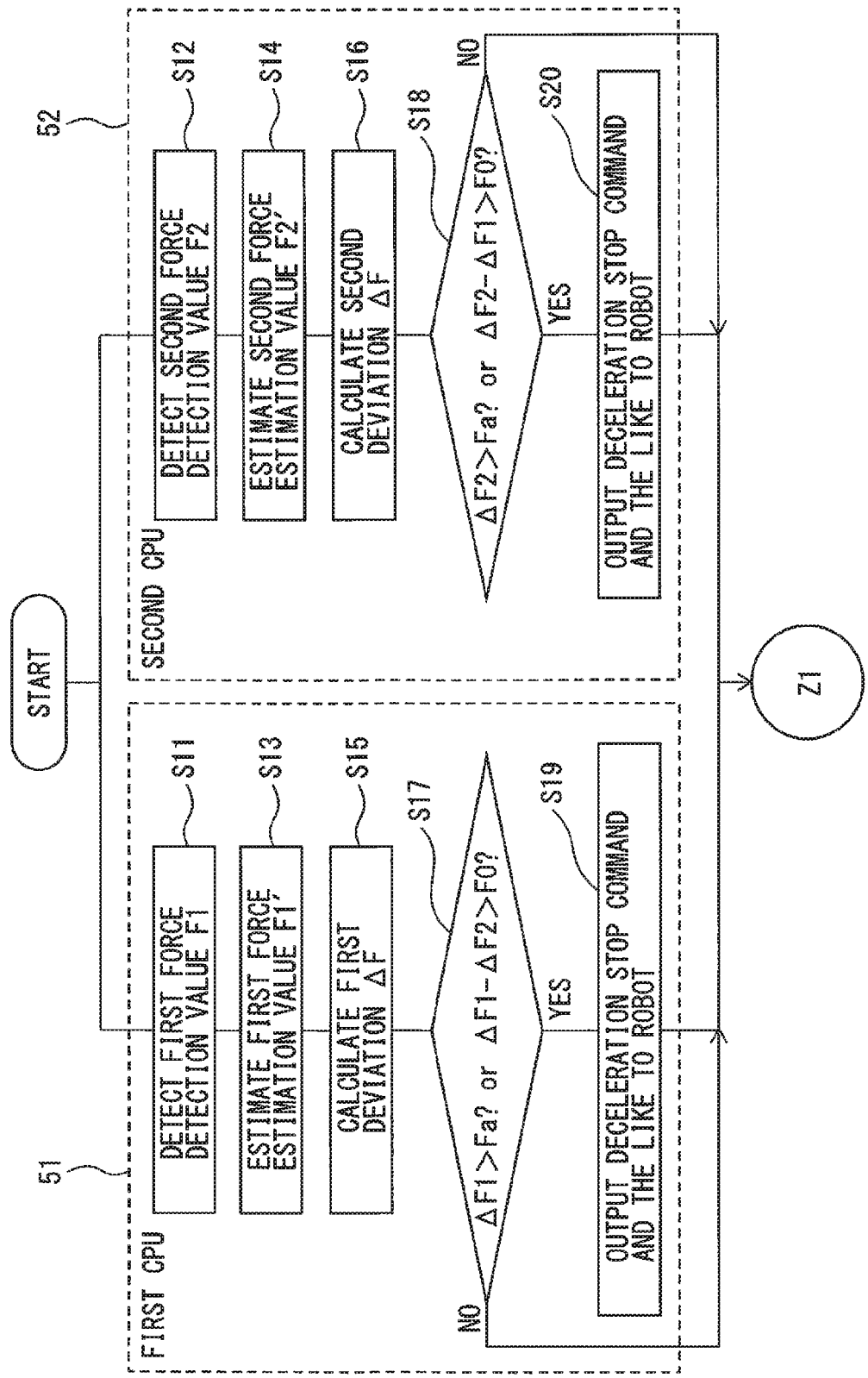

INDUSTRIAL ROBOT SYSTEM AND CONTROL METHOD THEREOF

RELATED APPLICATIONS

The present application claims priority to Japanese Patent Application Number 2015-151238 filed Jul. 30, 2015, the disclosure of which is hereby incorporated by reference herein in its entirety.

BACKGROUND OF THE INVENTION

1. Field of the Invention

The present invention relates to an industrial robot system and a control method thereof for performing cooperated work by having the same work space simultaneously shared by an industrial robot and a person.

2. Description of the Related Art

At a production site using a generally-available industrial robot, a safety fence separates a work space of a robot and a work space of a person from each other. Therefore, it is possible to avoid an accident in which a person comes into contact with the robot.

However, there is a production site in which a work space of a robot and a work space of a person cannot be separated from each other, and there is a production site where the productivity is significantly reduced when a work space of a robot and a work space of a person are separated from each other. In such a production site, a robot system that does not require any safety fence is desired.

When no safety fence is used, this increases the risk of a person coming in contact with a robot. Therefore, the impact of a collision of the robot with a person is reduced by, for example, limiting the power of the robot. Alternatively, the robot may be stopped when a person and the robot come into contact with each other.

An example of a work according to a robot system that does not use any safety fence as described above is as follows. In a work space as shown in the following example, a person and a robot conduct a cooperative work with each other.

(1) The robot carries an item from a warehouse to a work space.

(2) In the work space, the robot gives the item to a person.

(3) The robot moves to the warehouse in order to carry an item.

In a conventional robot system, it was necessary to operate an external input of a robot control apparatus with a switch and the like when proceeding from step (2) to step (3). However, in recent years, a person instructs an operation command to a robot by applying an external force to the robot main body.

Japanese Laid-Open Patent Publication No. 2008-200764 also indicates that an operation command is given to a manipulator by applying an external force to the manipulator. More specifically, in Japanese Laid-Open Patent Publication No. 2008-200764, when an operator adds a force to the manipulator with a particular regular pattern, this is recognized with a sensor of the manipulator. Then, a control unit of the manipulator outputs, to the manipulator, an operation command that is determined in accordance with the particular regular pattern.

SUMMARY OF INVENTION

However, with the configuration disclosed in Japanese Laid-Open Patent Publication No. 2008-200764, when the robot and a person or the robot and a peripheral device unexpectedly collide with each other, this collision cannot be detected. For this reason, an operation of the robot may endanger a person.

The present invention is made in view of such circumstances, and it is an object of the present invention to provide an industrial robot system and a control method thereof capable of ensuring safety of a person.

In order to achieve the above object, according to the first invention, an industrial robot system is provided, which includes a robot, a force detection unit detecting an external force applied to the robot, a force estimation unit estimating, as a force estimation value, an external force applied to the force detection unit from information about an operation of the robot, a deviation calculation unit calculating a deviation between the force estimation value and a force detection value applied to the robot obtained from information of the force detection unit, a comparison unit comparing the deviation and a first threshold value, and a command output unit, wherein when the comparison unit determines that the deviation is larger than the first threshold value, the command output unit outputs an operation command, a stop command, a deceleration command, or a deceleration stop command to the robot, and wherein when the deviation includes the at least one common deviation pattern, the fourth command output unit outputs the operation command corresponding to the at least one deviation pattern.

According to a second invention, only when the robot is at a stop or decelerating, the command output unit outputs the operation command corresponding to the at least one deviation pattern.

A third invention is based on the first or the second invention, and the force detection unit includes a first force detection unit and a second force detection unit, and the force estimation unit includes a first force estimation unit estimating, as a first force estimation value, an external force applied to the first force detection unit from information about an operation of the robot and a second force estimation unit estimating, as a second force estimation value, an external force applied to the second force detection unit from the information about an operation of the robot, and the deviation calculation unit includes a first deviation calculation unit calculating a first deviation between the first force estimation value and a first force detection value applied to the robot obtained from information of the first force detection unit and a second deviation calculation unit calculating a second deviation between the second force estimation value and a second force detection value applied to the robot obtained from information of the second force detection unit, and the comparison unit includes a first comparison unit comparing the first deviation and a first threshold value, and comparing the first deviation and the second deviation and a second comparison unit comparing the second deviation and the first threshold value, and comparing the second deviation and the first deviation, and the command output unit includes a first command output unit, wherein when the first comparison unit determines that the first deviation is larger than the first threshold value, or the first deviation and the second deviation are different by a certain level or more, the first command output unit outputs a stop command, a deceleration command, or a deceleration stop command to the robot and a second command output unit, wherein when the second comparison unit determines that the second deviation is larger than the first threshold value, or the second deviation and the first deviation are different by a certain level or more, the second command output unit outputs the stop command, the deceleration command, or the deceleration stop command to the robot.

A fourth invention is based on any one of the first to the third inventions, and the industrial robot system further includes: a third comparison unit comparing a program of the robot and a current situation of the robot; a third command output unit, wherein when the third comparison unit determines that the program of the robot and the current situation of the robot are different, the third command output unit outputs the stop command, the deceleration command, or the deceleration stop command to the robot; a storage unit associating and storing a plurality of deviation patterns having regularity with regard to deviations and operation commands of the robot respectively corresponding to the plurality of deviation patterns; a fourth comparison unit, wherein when the deviation is between the first threshold value and a second threshold value that is smaller than the first threshold value, or the deviation is larger than the first threshold value, the fourth comparison unit compares the deviation and the plurality of deviation patterns stored in the storage unit; a fourth command output unit, wherein when the fourth comparison unit determines that the deviation includes at least one common deviation pattern of the plurality of deviation patterns, the fourth command output unit outputs an operation command of the robot corresponding to the at least one deviation pattern.

A fifth invention is based on the fourth invention, and the plurality of deviation patterns stored in the storage unit include at least one of a magnitude of the deviation, a time interval between two consecutive peaks of the deviation, a direction of the deviation, a period of time in which the deviation is applied, an amount of change of the deviation in a unit time, a number of times the deviation is applied within a predetermined time.

According to a sixth invention, a control method of an industrial robot system is provided, and the control method includes detecting by a force detection unit an external force applied to the robot, estimating, as a force estimation value, an external force applied to the force detection unit from information about an operation of the robot, calculating a deviation between the force estimation value and a force detection value applied to the robot obtained from information of the force detection unit, comparing the deviation and a first threshold value, outputting an operation command, a stop command, a deceleration command, or a deceleration stop command to the robot when the deviation is determined to be larger than the first threshold value, and outputting the operation command corresponding to the at least one deviation pattern when the deviation includes the at least one common deviation pattern.

A seventh invention is based on the sixth invention, and only when the robot is at a stop or decelerating, the operation command corresponding to the at least one deviation pattern is output.

An eighth invention is based on the sixth or the seventh invention, and in the detection of the external force, the detection is performed by using a first force detection unit and a second force detection unit attached to the robot, and in the estimation of the force estimation value, an external force applied to the first force detection unit is estimated as a first force estimation value from information about an operation of the robot, and further, an external force applied to the second force detection unit is estimated as a second force estimation value from the information about an operation of the robot, and in the calculation of the deviation, a first deviation between the first force estimation value and a first force detection value applied to the robot obtained from information of the first force detection unit is calculated, and further, a second deviation between the second force estimation value and a second force detection value applied to the robot obtained from information of the second force detection unit is calculated, and in the comparison of the deviation, the first deviation and a first threshold value are compared, and the first deviation and the second deviation are compared, and further, the second deviation and the first threshold value are compared, and the second deviation and the first deviation are compared, and when the first deviation is determined to be larger than the first threshold value, or the first deviation and the second deviation are determined to be different by a certain level or more, a stop command, a deceleration command, or a deceleration stop command is output to the robot, and when the second deviation is determined to be larger than the first threshold value, or the second deviation and the first deviation are different by a certain level or more, the stop command, the deceleration command, or the deceleration stop command is output to the robot.

A ninth invention is based on any one of the sixth to the eighth invention, and a program of the robot and a current situation of the robot are compared, and when the program of the robot and the current situation of the robot are determined to be different, the stop command, the deceleration command, or the deceleration stop command is output to the robot, and when the deviation is smaller than the first threshold value and is larger than the second threshold value, or the deviation is larger than the first threshold value, the deviation and a plurality of deviation patterns having regularity with regard to the deviation are compared, and when the deviation is determined to include at least one common deviation pattern of the plurality of deviation patterns, an operation command of the robot corresponding to the at least one deviation pattern is output.

A tenth invention is based on the ninth invention, and the plurality of deviation patterns stored in the storage unit include at least one of a magnitude of the deviation, a time interval between two consecutive peaks of the deviation, a direction of the deviation, a period of time in which the deviation is applied, an amount of change of the deviation in a unit time, a number of times the deviation is applied within a predetermined time.

These objects, features, and advantages of the present invention will be further clarified from the detailed explanation about typical embodiments of the present invention as illustrated in the appended drawings.

BRIEF DESCRIPTION OF THE DRAWINGS

FIG. 3A is a first flowchart illustrating a control method of an industrial robot system as illustrated in FIG. 1.

DETAILED DESCRIPTION

Figure 1:
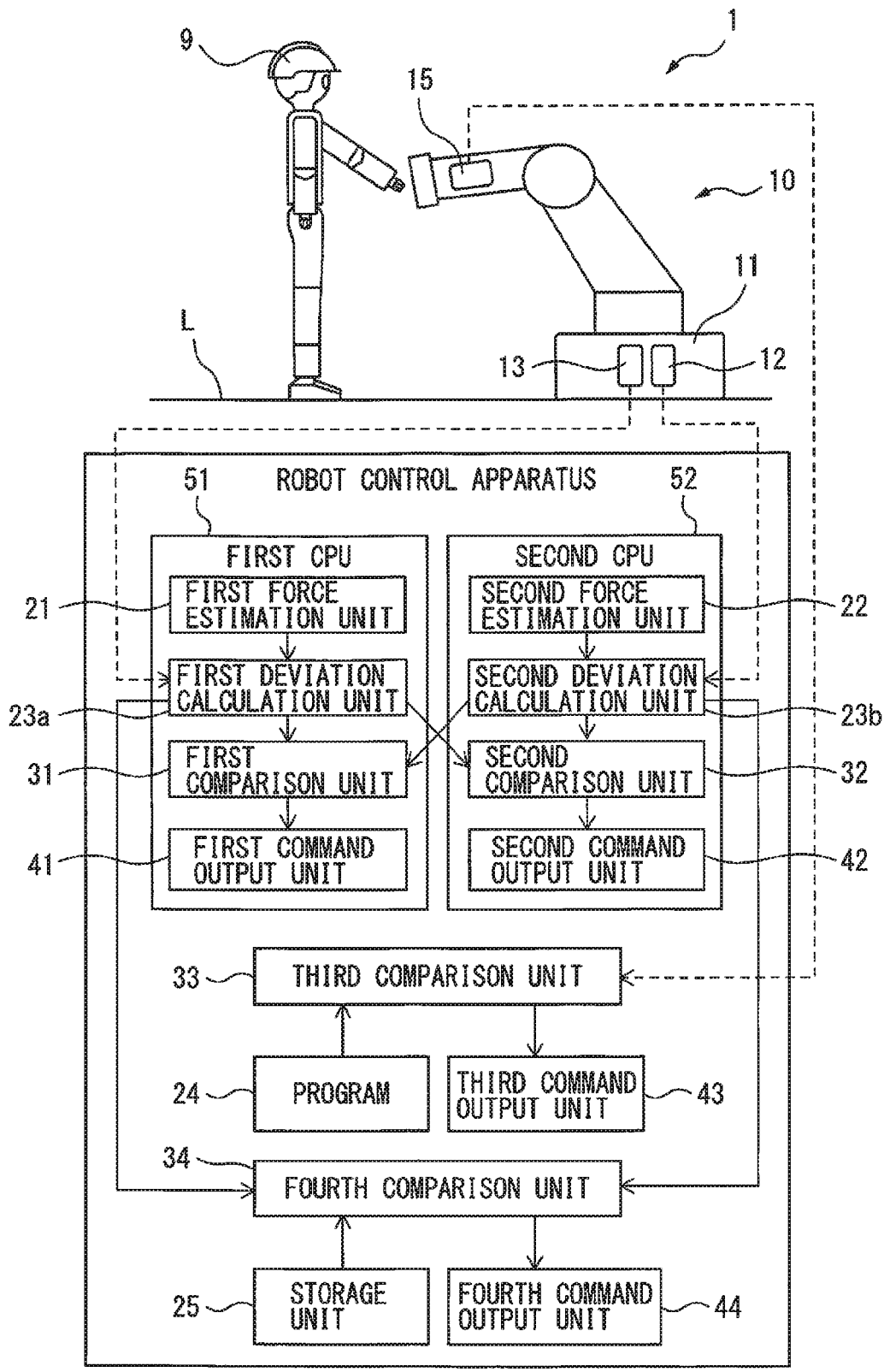
FIG. 1 is a functional block diagram illustrating an industrial robot system based on a first embodiment of the present invention.

Hereinafter, embodiments of the present invention will be explained with reference to appended drawings. In the following drawings, the same members are denoted with the same reference numerals. In order to facilitate understanding, the scales of these drawings are changed as necessary.

FIG. 1 is a functional block diagram illustrating an industrial robot system according to the first embodiment of the present invention. The industrial robot system 1 as illustrated in FIG. 1 mainly includes an industrial robot 10 (hereinafter simply referred to as a "robot 10") and a robot control apparatus 20 controlling the robot 10. In the industrial robot system 1, a person 9 and the robot 10 are located at the positions close to each other in order to perform cooperated work.

In FIG. 1, the robot 10 includes a servo motor for at least a single shaft and a mechanism unit synchronized with the servo motor. In a typical embodiment, the robot 10 is a six-axis vertical articulated robot, and includes six servo motors for six axes. Each of these servo motors includes an angle detection device 15, and, for example, an encoder. FIG. 1 illustrates, as a typical case, an angle detection device 15 which is one of a plurality of angle detection devices. Although not illustrated in the drawings, a gripping hand or a tool is considered to be provided at the end of the robot arm.

As illustrated in FIG. 1, a robot support unit 11 of the robot 10 is provided on a floor unit L. The main body of the robot 10 is arranged on the robot support unit 11. A first force sensor 12 and a second force sensor 13 are arranged adjacent to each other in the robot support unit 11. These force sensors 12, 13 are six-axis force sensors of the same type capable of detecting, with a strain gauge, the amount of strain applied to the elastic body and detecting the force in three directions and the torque around the three axes. For example, the first force sensor 12 and the second force sensor 13 respectively detect information about the external force applied to the robot support unit 11 or the robot 10 as a resistance value [Ω], a voltage value [V], or a force [N] according to the external force.

The first force sensor 12 and the second force sensor 13 are attached to the robot support unit 11 located at the bottom portion of the robot 10. Therefore, regardless of the posture of the robot 10 and the location and direction where the external force is applied to the robot 10, the first force sensor 12 and the second force sensor 13 can efficiently detect the external force applied to the robot 10.

In the present embodiment, in order to detect the external force applied to the robot 10, the sensors 12, 13 are attached to the robot support unit 11 located at the bottom portion of the robot 10. However, as long as the external force applied to the robot 10 can be detected, the attachment positions of the sensors 12, 13 are not limited to what has been described above, and the external force may be detected according to other methods.

The robot control apparatus 20 as illustrated in FIG. 1 is a digital computer, and includes a first CPU 51 and a second CPU 52. As illustrated in FIG. 1, the first CPU 51 includes a first force estimation unit 21 for estimating, as a first force estimation value F1', the external force applied to the first force sensor 12 from information about operation of the robot 10 in accordance with a known method. Likewise, the second CPU 52 includes the second force estimation unit 22 for estimating, as a second force estimation value F2', the external force applied to the second force sensor 13 from information about operation of the robot 10 in accordance with a known method.

The external forces applied to the first force sensor 12 and the second force sensor 13 change in accordance with the information about operation of the robot 10. Such information includes, for example, the mass of the robot 10, the mass of a workpiece to be gripped when the robot 10 includes a gripping hand, the posture of each axis of the robot 10, the acceleration of each axis of the robot 10, and the like. The mass of the robot 10 and the mass of the workpiece are already known. The posture of each axis of the robot 10, the acceleration of each axis of the robot 10, and the like can be derived from the detection values of the angle detection devices 15. The first force estimation unit 21 and the second force estimation unit 22 calculate the first force estimation value F1' and the second force estimation value F2', respectively, on the basis of the information about operation of the robot 10 described above.

Further, the first CPU 51 includes a first deviation calculation unit 23a calculating a first deviation $\Delta F1$ between the first force estimation value F1' and the first force detection value F1 applied to the robot support unit 11 obtained from the information of the first force detection unit 12. Likewise, the second CPU 52 includes a second deviation calculation unit 23b calculating a second deviation $\Delta F2$ between the second force estimation value F2' and the second force detection value F2 applied to the robot support unit 11 obtained from the information of the second force detection unit 13.

Further, the first CPU 51 includes a first comparison unit 31 for comparing the first deviation $\Delta F1$ and the first threshold value Fa and comparing the first deviation $\Delta F1$ and the second deviation $\Delta F2$ and a first command output unit 41 outputting a stop command, a deceleration command, or a deceleration stop command to the robot 10 when the first comparison unit 31 determines that the first deviation $\Delta F1$ is larger than the first threshold value Fa or determines that a difference between the first deviation $\Delta F1$ and the second deviation $\Delta F2$ is equal to or larger than a certain level. It should be noted that the first threshold value Fa and the second threshold value Fb explained later are considered to be derived in advance through an experiment and the like.

Likewise, the second CPU 52 includes a second comparison unit 32 for comparing the second deviation $\Delta F2$ and the first threshold value Fa and comparing the second deviation $\Delta F2$ and the first deviation $\Delta F1$ and a second command output unit 42 outputting a stop command, a deceleration command, or a deceleration stop command to the robot 10 when the second comparison unit 32 determines that the second deviation $\Delta F2$ is larger than the first threshold value Fa or determines that a difference between the second deviation $\Delta F2$ and the first deviation $\Delta F1$ is equal to or larger than a certain level.

The robot control apparatus 20 includes a third comparison unit 33 for comparing a program 24 of the robot 10 and the current situation of the robot 10 and a third command output unit 43 outputting a stop command, a deceleration command, or a deceleration stop command to the robot 10 when the third comparison unit 33 determines that the program 24 of the robot 10 and the current situation of the robot 10 are different. It should be noted that each of the stop command, the deceleration command, or the deceleration stop command that is output from the first command output unit 41, the second command output unit 42, and the third command output unit 43 is assumed to be the same.

Alternatively, instead of the third comparison unit 33 and the third command output unit 43, the first CPU 51 may serve as a third comparison unit #1 comparing the program 24 of the robot 10 and the current situation of the robot 10 and a third command output unit #1 outputting a stop command, a deceleration command, or a deceleration stop command to the robot 10 when the third comparison unit #1 determines that the program 24 of the robot 10 and the current situation of the robot 10 are different. Likewise, the second CPU 52 may serve as a third comparison unit #2 comparing the program 24 of the robot 10 and the current situation of the robot 10 and a third command output unit #2 outputting a stop command, a deceleration command, or a deceleration stop command to the robot 10 when the third comparison unit #2 determines that the program 24 of the robot 10 and the current situation of the robot 10 are different.

Further, the robot control apparatus 20 includes a storage unit 25 associating and storing a plurality of deviation patterns having regularities with regard to the first deviation ΔF1 and the second deviation ΔF2 and operation commands of the robot 10 respectively corresponding to the plurality of deviation patterns, a fourth comparison unit 34 comparing the first deviation ΔF1 and the second deviation ΔF2 and the plurality of deviation patterns stored in the storage unit 25 when both of the first deviation ΔF1 and the second deviation ΔF2 are smaller than the first threshold value Fa but are larger than the second threshold value Fb, and a fourth command output unit 44. When the fourth comparison unit 34 determines that both of the first deviation ΔF1 and the second deviation ΔF2 include at least one common deviation pattern of the plurality of deviation patterns, the fourth command output unit 44 outputs an operation command of the robot 10 corresponding to the at least one deviation pattern.

Alternatively, instead of the fourth comparison unit and the fourth command output unit 44, the first CPU 51 may serve as the fourth comparison unit #1 comparing the first deviation ΔF1 and the plurality of deviation patterns stored in the storage unit 25. Likewise, the second CPU 52 may serve as the fourth comparison unit #2 comparing the second deviation ΔF2 and the plurality of deviation patterns stored in the storage unit 25. Further, each of the first CPU 51 and the second CPU 52 may serve as the fourth command output units #1, #2. When the fourth comparison unit #1 and the fourth comparison unit #2 determine that both of the first deviation ΔF1 and the second deviation ΔF2 include at least one common deviation pattern of the plurality of deviation patterns, the fourth command output units #1, #2 output an operation command of the robot 10 corresponding to the at least one deviation pattern.

The deviation pattern is a mode of an external force given to the robot 10 when a person 9 regularly or intentionally taps or presses the robot 10. The deviation pattern includes at least one of a magnitude of an external force, a time interval between peaks of two consecutive external forces, a direction of an external force, a period of time in which the external force is applied, an amount of change of an external force in a unit time, and the number of times of external forces applied in a predetermined time.

Figure 2:
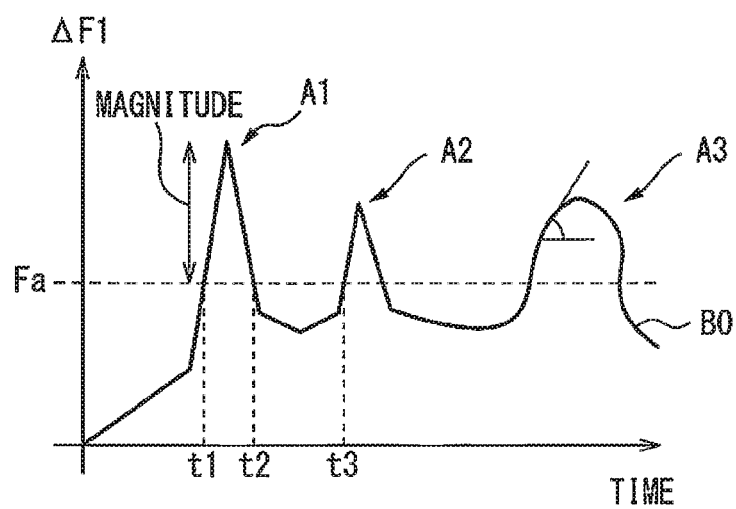
FIG. 2 is a figure illustrating a relationship of a deviation and a time.

FIG. 2 is a figure illustrating a relationship of a deviation, e.g., the first deviation ΔF1, and a time. It should be noted that the second deviation ΔF2 may also show almost the same behavior as FIG. 2. FIG. 2 also illustrates the first threshold value Fa. In FIG. 2, a solid line B0 representing the behavior of the first deviation ΔF1 successively includes three peaks A1, A2, A3 that are larger than the first threshold value Fa.

As can be understood from FIG. 2, the magnitudes of the external forces in the deviation pattern mean the maximum heights of the peaks A1, A2, A3 from the first threshold value Fa. A time interval between peaks of two consecutive external forces means, for example, a time interval t3-t1 between times t1 and t3 at which the two peaks A1, A2 begin to exceed the first threshold value Fa. Further, the period of time in which the external force is applied means, for example, a time in which the peak A1 is larger than the first threshold value Fa, i.e., a period of time t2-t1. Further, as can be understood by referring to the peak A3, the amount of change in the external force in the unit time is the inclination of a solid line B0 at any given point in time. The number of times the external force is applied within a predetermined period of time is the number of times the external force is larger than the first threshold value Fa in the predetermined period of time, i.e., the number of peaks, which is three times in the example of FIG. 2. The direction of the external force is a direction in which a person 9 adds the external force to the robot 10, and, for example, it is a downward direction, an upward direction, or the like.

In the present invention, each of such deviation patterns is associated with the operation command of the robot 10 in advance. Therefore, when a person 9 intentionally gives a predetermined deviation pattern to the robot 10, a desired operation command is caused to output, and the robot 10 can be caused to perform the operation. In the present invention, as can be understood, various deviation patterns can be employed, and therefore, precise operation commands can be output.

Figure 3B:
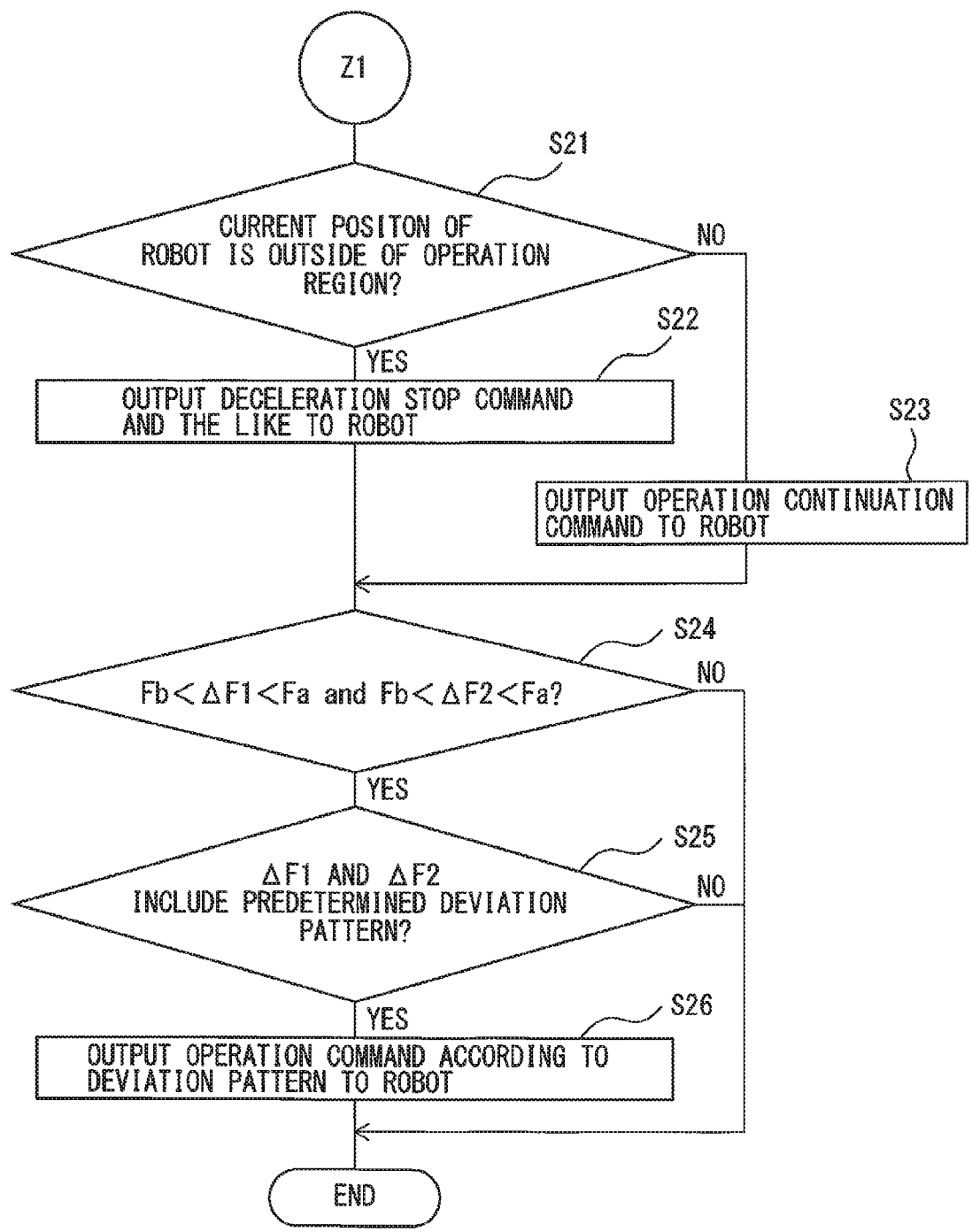
FIG. 3B is a second flowchart illustrating a control method of an industrial robot system as illustrated in FIG. 1.

FIG. 3A and FIG. 3B are flowcharts illustrating a control method of the industrial robot system as illustrated in FIG. 1. The operation as illustrated in FIG. 3A and FIG. 3B is considered to be repeatedly performed on every predetermined control cycle. Hereinafter, the control method of the industrial robot system 1 according to the present invention will be explained with reference to FIG. 1, FIG. 3A, and FIG. 3B.

As can be understood from FIG. 3A, in the present invention, the processing with the first CPU 51 and the processing with the second CPU 52 are assumed to be performed in parallel. In step S11, the first force sensor 12 obtains information about an external force applied to the robot 10. Then, the first force detection value F1 applied to the robot support unit 11 is derived from the information. Further, in step S12, the second force sensor 13 obtains information about the external force applied to the robot 10. Then, the second force detection value F2 applied to the robot support unit 11 is derived from the information.

Then, in step S13, the first force estimation unit 21 estimates the external force applied to the first force sensor 12 as the first force estimation value F1', and in step S14, the second force estimation unit 22 estimates the external force applied to the second force sensor 13 as the second force estimation value F1'. It should be noted that the first force detection value F1, the second force detection value F2, the estimated first force estimation value F1', and the estimated second force estimation value F2' are assumed to be associated with the time and stored in the storage unit 25 successively.

Further, in step S15, the first deviation calculation unit 23a calculates the first deviation ΔF1 by subtracting the first force estimation value F1' from the first force detection value F1 applied to the robot support unit 11 obtained from the information of the first force detection unit 12. Likewise, in step S16, the second deviation calculation unit 23b calculates the second deviation ΔF2 by subtracting the second force estimation value F2' from the second force detection value F2 applied to the robot support unit 11 obtained from the information of the second force detection unit 13.

Figure 4:
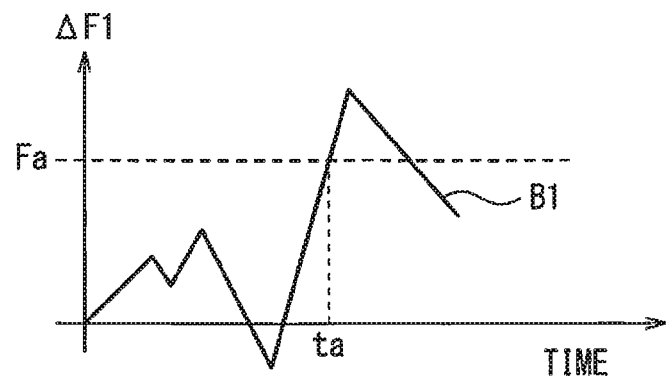
FIG. 4 is a figure illustrating a relationship of a first deviation and a time.

Subsequently, in step S17, the first comparison unit 31 compares the first deviation ΔF1 and the first threshold value Fa, and compares the first deviation ΔF1 and the second deviation ΔF2, so that the first comparison unit 31 determines whether the difference between the first deviation ΔF1 and the second deviation ΔF2 is equal to or larger than a predetermined quantity F0. FIG. 4 is a figure illustrating a relationship of a first deviation and a time. A solid line B1 representing the behavior of the first deviation ΔF1 as illustrated in FIG. 4 is larger than the first threshold value Fa at a time ta. Although not illustrated in FIG. 4, the second deviation ΔF2 may also show almost the same behavior.

In step S17, when the first deviation ΔF1 is larger than the first threshold value Fa, it is most likely that the robot 10 and a person 9 or the peripheral device collide with each other due to, for example, an unexpected operation of the robot 10. When the difference between the first deviation ΔF1 and the second deviation ΔF2 is equal to or larger than the predetermined quantity F0, it is most likely that any one of the first force sensor 12 and the second force sensor 13 is broken. Therefore, when the first deviation ΔF1 is larger than the first threshold value Fa or when the difference between the first deviation ΔF1 and the second deviation ΔF2 is equal to or larger than the predetermined quantity F0, step S19 is subsequently performed.

In step S19, the first command output unit 41 outputs a predetermined stop command, a predetermined deceleration command, or a predetermined deceleration stop command to the robot 10. Therefore, the robot 10 is stopped and/or decelerated, so that the safety of a person 9 is ensured. It should be noted that the stop command may be a stop command for causing each motor of the robot 10 to be in a non-excited state or a stop command for causing each motor of the robot 10 to be in an excited state.

In step S19, any one of the stop command, the deceleration command, or the deceleration stop command may be output, which is also applicable to other steps. For example, the operator can configure in advance to output a desired command of the stop command, the deceleration command, or the deceleration stop command. Alternatively, the current speed of the robot 10 may be referred to, and when the speed is larger than the upper limit value, the deceleration command is output, and when the speed is smaller than the lower limit value, the stop command is output, and when the speed is between the upper limit value and the lower limit value, the deceleration stop command may be output. In any case, in step S19, the first command output unit 41 is considered to output a command for reducing the speed of the robot 10. It should be noted that the second command output unit 42 and the third command output unit 43 explained late operate in the same manner.

In step S18, the second comparison unit 32 compares the second deviation ΔF2 and the first threshold value Fa, and compares the second deviation ΔF2 and the first deviation ΔF1 to determine whether the difference between the second deviation ΔF2 and the first deviation ΔF1 is equal to or larger than the predetermined quantity.

Then, in step S18, when the second deviation ΔF2 is larger than the first threshold value Fa, it is most likely that the robot 10 and a person 9 or the peripheral device collide with each other due to, for example, an unexpected operation of the robot 10. When the difference between the second deviation ΔF2 and the first deviation ΔF1 is equal to or larger than the predetermined quantity F0, it is most likely that any one of the second force sensor 13 and the first force sensor 12 is broken. Therefore, when the second deviation ΔF2 is larger than the first threshold value Fa or when the difference between the second deviation ΔF2 and the first deviation ΔF1 is equal to or larger than the predetermined quantity F0, step S20 is subsequently performed.

In step S20, the second command output unit 42 outputs a predetermined stop command, a predetermined deceleration command, or a predetermined deceleration stop command to the robot 10 as described above. Therefore, the robot 10 is stopped and/or decelerated, so that the safety of a person 9 is ensured.

As described above, in the present invention, when the robot 10 and a person 9 or the peripheral device collide with each other, and the first deviation ΔF1 or the second deviation ΔF2 is larger than the first threshold value Fa, the robot 10 is caused to stop and/or decelerated. Further, even when the first force detection unit 12 or the second force detection unit 13 breaks down, and even when the difference between the first deviation ΔF1 and the second deviation ΔF2 is equal to or larger than the predetermined quantity F0, the robot 10 is caused to be stopped and/or decelerated.

Such control is performed in parallel in the first CPU 51 including the first command output unit 41 associated with the first force estimation unit 21 and the second CPU 52 including the second command output unit 42 associated with the second force estimation unit 22. In other words, as can be understood from FIG. 3A, the first CPU 51 is configured to perform steps S11, S13, S15, S17, and S19, and the second CPU 52 is configured to perform steps S12, S14, S16, S18, and S20.

Therefore, in the present invention, the control explained above is performed by the duplexed CPUs 51, 52. For this reason, in the present invention, a collision with respect to a person 9 and the like and a malfunction of force detection units 12, 13 are detected while the redundancy is ensured, and the robot 10 is stopped and/or decelerated. As a result, the safety of a person 9 can be ensured.

In the present invention, not both of the first deviation Δ1 and the second deviation Δ2 are required to be larger than the first threshold value Fa in order to stop and/or decelerate the robot 10. Therefore, even when any one of the first force sensor 12 and the second force sensor 13 breaks down, the robot can be reliably stopped or decelerated.

The operation region of each axis of the robot 10 may be limited by the program 24 so as to allow the robot 10 to operate only in a certain range. In such case, in step S21, a current position Pc of the robot 10 is calculated by using the value detected by the angle detection device 15 of each axis of the robot 10. Then, the third comparison unit 33 refers to the program 24 of the robot 10 and determines whether the current position Pc of the robot 10 is outside of the operation region limited by the program 24.

When the current position Pc of the robot 10 is outside of the operation region, the robot 10 can be determined to be in an abnormal state. In such case, step S22 is subsequently performed, and the third command output unit 43 outputs a predetermined stop command, a predetermined deceleration command, or a predetermined deceleration stop command to the robot 10. The robot 10 is thereby stopped and/or decelerated, so that the safety of a person 9 is ensured in the same manner.

In step S21, instead of calculating the current position Pc of the robot 10, the operation speed of each axis of the robot 10 may be calculated by using the detection values of the plurality of angle detection devices 15. In this case, when the operation speed of each axis of the robot 10 is larger than a predetermined speed, the robot 10 is determined to be in an abnormal state.

When the current position Pc of the robot 10 is not outside of the operation region, step S23 is subsequently performed. In this case, the robot 10 can be determined to be operating normally, and therefore, in step S23, the third command output unit 43 outputs an operation continuation command to the robot 10. In this case, the robot 10 is assumed to operate in accordance with the description of the program 24.

Subsequently, step S24 is subsequently performed, and the fourth comparison unit 34 determines whether the first deviation ΔF1 is between the first threshold value Fa and the second threshold value Fb which is smaller than the first threshold value Fa, and determines whether the second deviation ΔF2 is between the first threshold value Fa and the second threshold value Fb. Then, when both of the first deviation ΔF1 and the second deviation ΔF2 are between the first threshold value Fa and the second threshold value Fb, step S25 is subsequently performed. In contrast, when at least one of the first deviation ΔF1 and the second deviation ΔF2 is not between the first threshold value Fa and the second threshold value Fb, the processing is terminated without outputting the operation command explained later.

In step S25, the fourth comparison unit 34 compares the first deviation ΔF1 and the second deviation ΔF2 with a plurality of deviation patterns stored in the storage unit 25. The first deviation ΔF1 and the second deviation ΔF2 compared with the deviation patterns need not be a single value. Alternatively, the first deviation ΔF1 and the second deviation ΔF2 may be a plurality of values stored in the storage unit 25 in time series over a predetermined time interval(s).

Then, in step S25, when both of the first deviation ΔF1 and the second deviation ΔF2 include at least one common deviation pattern, it can be determined that an external force making a deviation pattern is given to the robot 10 by, for example, a person 9 regularly or intentionally pressing the robot 10 by hand. In such case, step S26 is subsequently performed, and the fourth command output unit 44 outputs an operation command corresponding to the deviation pattern explained above.

Figure 5:
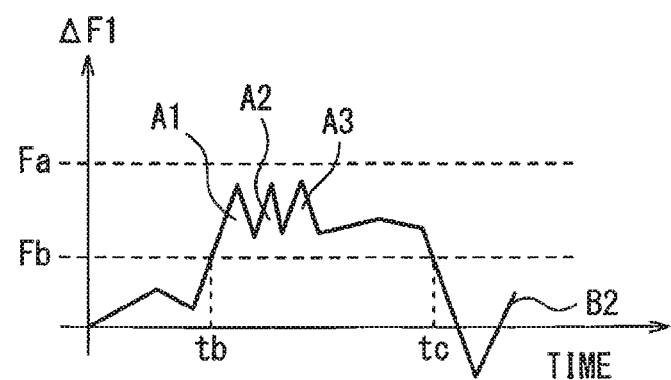
FIG. 5 is another figure illustrating a relationship of the first deviation and the time.

In this case, FIG. 5 is another figure illustrating a relationship of a first deviation and a time. It should be noted that the second deviation ΔF2 may also show almost the same behavior as that illustrated in FIG. 5. A solid line B2 representing the behavior of the first deviation ΔF1 as illustrated in FIG. 5 exceeds the second threshold value Fb but is below the first threshold value Fa between the time tb and the time tc. The solid line B2 includes three peaks A1, A2, A3 between the time tb and the time tc.

In the example as illustrated in FIG. 5, three peaks emerges between the time tb and the time tc. When the storage unit 25 stores, for example, an operation command associated with a case where the number of peaks is three, the fourth command output unit 44 outputs the operation command. In the example as illustrated in FIG. 5, the number of external forces applied within predetermined time is used as a deviation pattern, but other deviation patterns may also be used.

As described above, in the present invention, only when both of the first deviation Δ1 and the second deviation Δ2 include a common deviation pattern, an operation command corresponding to the deviation pattern is output. In contrast, when only one of the first deviation Δ1 and the second deviation Δ2 includes a deviation pattern or when neither the first deviation Δ1 nor the second deviation Δ2 includes any deviation pattern, the processing is terminated without outputting the operation command. Therefore, the robot 10 is less likely to operate incorrectly, and the safety of a person can be ensured.

The operation command that is output from the fourth command output unit 44 is, for example, a predetermined operation that is performed from the state in which the robot 10 is at a stop or is decelerating. In this case, only when the robot 10 is at a stop or is decelerating and both of the first deviation ΔF1 and the second deviation ΔF2 include at least one common deviation pattern, an operation command corresponding to the deviation pattern may be output. In this case, a person 9 gives an external force making a desired deviation pattern to the robot that is at a stop or is decelerating, so that the robot 10 is activated. Therefore, an output unit (not shown) outputting sound and light is preferably provided in order to notify that the robot 10 starts operation. In such case, even if a person 9 gives an external force making a desired deviation pattern when the robot 10 is moving at a constant speed or is accelerating, the operation command is not output. Thus, a person 9 finds no reason to give an external force making a desired deviation pattern to the robot 10 that is moving at a constant speed or is accelerating, and as a result, the safety of a person 9 can be ensured.

Alternatively, the operation command that is output from the fourth command output unit 44 may include the stop command, the deceleration command, or the deceleration stop command of the robot 10 explained above. Such operation command is advantageous because, e.g., a person 9 can directly stop the robot 10 when the robot 10 is unexpectedly operating. In other words, in this case, the fourth command output unit 44 can be caused to function as an emergency stop switch.

Figure 6:
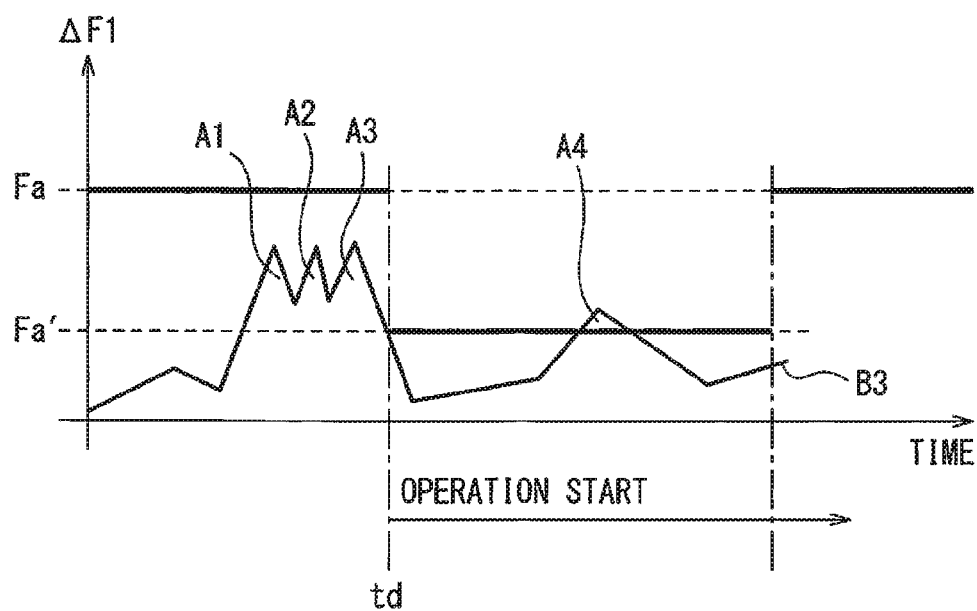
FIG. 6 is still another figure illustrating a relationship of the first deviation and the time.

Alternatively, the operation command that is output from the fourth command output unit 44 may be a command for changing the first threshold value Fa to another first threshold value Fa' smaller than the first threshold value Fa for only a predetermined time. FIG. 6 is still another figure illustrating a relationship of a first deviation and a time. In FIG. 6, a solid line B3 representing the behavior of the first deviation ΔF1 appears. Although not illustrated in FIG. 6, the second deviation ΔF2 may also show almost the same behavior.

At the time td after the three peaks have been detected as illustrated in FIG. 6, an operation command associated with a case where the number of peaks is three is output. This operation command is a designation for causing the robot 10 to start operation from the stop state.

In general, during a predetermined time immediately after the robot 10 starts operation, it is preferable to highly sensitively detect collision of the robot 10 and a person 9 or the peripheral device with each other. Therefore, the operation command in the example as illustrated in FIG. 6 further includes a command for reducing the first threshold value Fa to the first threshold value Fa' for the predetermined time. It should be noted that the first threshold value Fa' is larger than the second threshold value Fb.

In such case, it is possible to highly sensitively detect collision of the robot 10 and a person 9 or the like with each other only during the predetermined time immediately after the robot 10 starts operation. More specifically, when a peak A4 that is smaller than the first threshold value Fa but is larger than the first threshold value Fa' is detected within this predetermined time, the stop command, the deceleration command, or the deceleration stop command can be output to the robot 10, and the safety of a person 9 can be further ensured. When a person 9 presses the robot 10 by mistake during this predetermined time, the robot 10 can also be immediate stopped.

Figure 7:
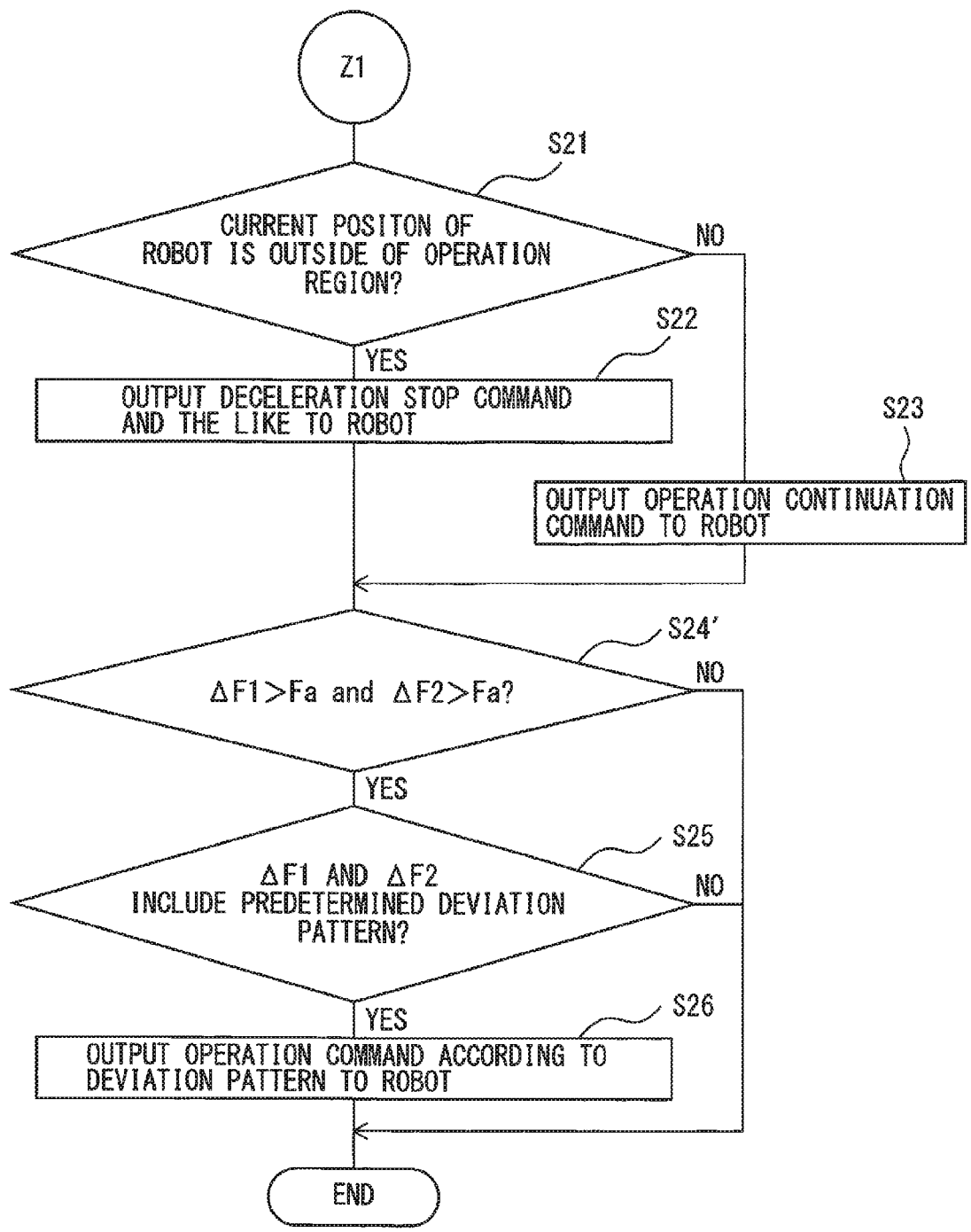
FIG. 7 is a portion of a flowchart illustrating a control method of an industrial robot system based on a second embodiment of the present invention.

By the way, FIG. 7 is a portion of a flowchart illustrating a control method of an industrial robot system based on the second embodiment of the present invention. In the second embodiment, step S24' of FIG. 7 is followed instead of step S24 of FIG. 3B, while the other steps are the same as those of the first embodiment.

Therefore, the difference in the industrial robot system 1 according to the second embodiment from the first embodiment will be mainly explained. In step S24', the fourth comparison unit 34 only determines whether both of the first deviation ΔF1 and the second deviation ΔF2 are larger than the first threshold value Fa or not.

Figure 8:
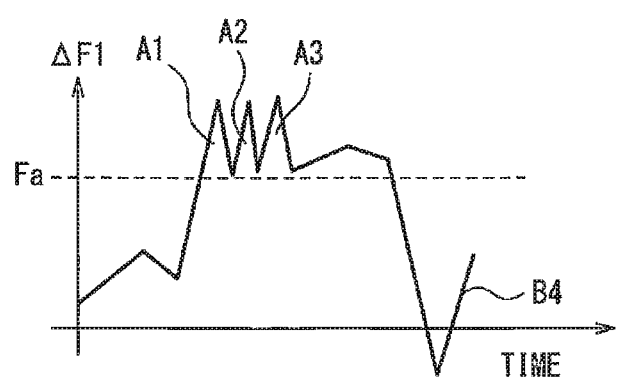
FIG. 8 is another figure illustrating a relationship of a first deviation and a time.

In this case, FIG. 8 is another figure illustrating a relationship of a first deviation and a time. In FIG. 8, a solid line B4 showing the behavior of the first deviation ΔF1 is shown. Although not shown in FIG. 8, the second deviation ΔF2 may also show almost the same behavior. As illustrated in FIG. 8, when the first deviation ΔF1 is larger than the first threshold value Fa, and the second deviation ΔF2 is also larger than the first threshold value Fa, step S25 is subsequently performed. In step S25, the fourth comparison unit 34 compares the first deviation ΔF1 and the second deviation ΔF2 and a plurality of deviation patterns stored in the storage unit 25.

When both of the first deviation ΔF1 and the second deviation ΔF2 include at least one common deviation pattern, it can be determined that an external force making a deviation pattern is given to the robot 10 by, for example, a person 9 regularly or intentionally pressing the robot 10 by hand. In such case, step S26 is subsequently performed, and the fourth command output unit 44 outputs an operation command corresponding to the deviation pattern. In the second embodiment, the same effects as those of the first embodiment are obtained, and in addition, it is not necessary to set the second threshold value Fb. Therefore, it is understood that the second embodiment is simpler than the first embodiment.

Further, in an embodiment not illustrated, when the first deviation ΔF1 and the second deviation ΔF2 include a plurality of common deviation patterns, operation commands corresponding to the common deviation patterns may be arranged so as not to be output. More specifically, steps S24 to S26 in FIG. 3B and steps S24' to S26 in FIG. 7 may be omitted. Alternatively, in another embodiment not illustrated, steps S21 to step S22 only may be omitted.

The first force detection unit 12 and the second force detection unit 13 as illustrated in FIG. 1 may be collectively used as a force detection unit, or the first force detection unit 12 and the second force detection unit 13 may be used as independent force detection units. Likewise, the first force estimation unit 21 and the second force estimation unit 22 may be collectively used as a force estimation unit, or the first force estimation unit 21 and the second force estimation unit 22 may be used independently. Likewise, the first deviation calculation unit 23a and the second deviation calculation unit 23b may be collectively used as deviation calculation units, or the first deviation calculation unit 23a and the second deviation calculation unit 23b may be used independently. Likewise, the first comparison unit 31 and the second comparison unit 32 may be collectively used as a comparison unit, or the first comparison unit 31 and the second comparison unit 32 may be used independently. Likewise, the first command output unit 41 and the second command output unit 42 may be collectively used as a command output unit, or the first command output unit 41 and the second command output unit 42 may be used independently. Such cases are also included in the scope of the present invention.

Advantages of the Invention

In the first and the sixth inventions, when the robot and a person or the peripheral device collide with each other, and the first deviation is larger than the first threshold value, for example, a retraction operation is performed, and when the first deviation includes a deviation pattern with the robot that is stopped or decelerated, an operation command corresponding to the deviation pattern is output. An operation command can be directly given by giving an external force pattern to a robot that can ensure safety of a person during collision.

In the second and the seventh inventions, only when the robot stops or decelerates, a person gives an external force making a desired deviation pattern to the robot, so that an operation command corresponding to the deviation pattern is output. Therefore, when a person gives an external force making a desired deviation pattern, the robot can be activated. When the robot is moving at a constant speed or accelerating, a person cannot give an external force making a desired deviation pattern. Therefore, the safety of a person can be further ensured.

In the third and the eighth inventions, when the robot and a person or the peripheral device collide with each other, and the first deviation or the second deviation is larger than the first threshold value, the robot can be stopped and/or decelerated, and further, when the first force detection unit or the second force detection unit malfunctions and the first deviation and the second deviation are different by a predetermined quantity or more, the robot can also be stopped and/or decelerated. Such control is performed in both of the first command output unit associated with the first force estimation unit and the first command output unit associated with the second force estimation unit and the second command output unit associated with the second force estimation unit. Therefore, while the redundancy is ensured, a collision with a person and the like and a malfunction in the force detection unit can be detected, and the robot can be stopped and/or decelerated, so that the safety of a person can be ensured.

Only when both of the first deviation and the second deviation include a deviation pattern, an operation command corresponding to the deviation pattern is output. When only one of the first deviation and the second deviation includes a deviation pattern or when neither the first deviation nor the second deviation includes the deviation pattern, an operation command is not output. Therefore, in the robot capable of detecting, while the redundancy is ensured, a collision with a person and the like and a malfunction in the force detection unit to stop and/or decelerate the robot so that the safety of a person can be ensured, the robot is less likely to operate incorrectly even when a deviation pattern is given as an operation command to the robot, and as a result, the safety of a person can be ensured. When the first deviation and the second deviation are compared with the deviation pattern, the first deviation and the second deviation stored over the predetermined time may be used.

In the fourth and the ninth inventions, the program of the robot and the current situation are compared, and even when the current situation is not according to the program, the robot can be stopped and/or decelerated. Therefore, for example, when the robot runs uncontrollably, the robot can be stopped, and the safety of a person can be further ensured.

In the fifth and the tenth inventions, various deviation patterns can be employed. Therefore, precise operation commands can be output.

The present invention has been explained using typical embodiments, but a person skilled in the art would understand that changes described above, other various changes, omissions, and additions can be made without deviating from the scope of the present invention. Combining the embodiments described above as appropriate is included in the scope of the present invention.

The invention claimed is:

1. An industrial robot system, comprising:
    a robot;
    a force detection unit detecting an external force applied to the robot;
    a force estimation unit estimating, as a force estimation value, an external force applied to the force detection unit from information about an operation of the robot;
    a deviation calculation unit calculating a deviation between the force estimation value and a force detection value applied to the robot obtained from information of the force detection unit;
    a comparison unit comparing the deviation and a first threshold value; and
    a command output unit, wherein
    when the comparison unit determines that the deviation is larger than the first threshold value, the command output unit outputs a retraction command, a stop command, a deceleration command, or a deceleration stop command to the robot, and
    when the deviation includes at least one deviation pattern, the command output unit outputs an operation command corresponding to the at least one deviation pattern.

2. The industrial robot system according to claim 1, wherein only when the robot is at a stop or decelerating, the command output unit outputs the operation command corresponding to the at least one deviation pattern.

3. The industrial robot system according to claim 1, wherein
    the force detection unit includes a first force detection unit and a second force detection unit,
    the force estimation unit includes:
        a first force estimation unit estimating, as a first force estimation value, an external force applied to the first force detection unit from the information about the operation of the robot, and
        a second force estimation unit estimating, as a second force estimation value, an external force applied to the second force detection unit from the information about the operation of the robot,
    the deviation calculation unit includes:
        a first deviation calculation unit calculating a first deviation between the first force estimation value and a first force detection value applied to the robot obtained from information of the first force detection unit, and
        a second deviation calculation unit calculating a second deviation between the second force estimation value and a second force detection value applied to the robot obtained from information of the second force detection unit,
    the comparison unit includes:
        a first comparison unit comparing the first deviation and the first threshold value, and comparing the first deviation and the second deviation, and
        a second comparison unit comparing the second deviation and the first threshold value, and comparing the second deviation and the first deviation, and
    the command output unit includes:
        a first command output unit, wherein when the first comparison unit determines that the first deviation is larger than the first threshold value, or when the first deviation and the second deviation are different by a certain level or more, the first command output unit outputs the stop command, the deceleration command, or the deceleration stop command to the robot, and
        a second command output unit, wherein when the second comparison unit determines that the second deviation is larger than the first threshold value, or when the second deviation and the first deviation are different by a certain level or more, the second command output unit outputs the stop command, the deceleration command, or the deceleration stop command to the robot.

4. The industrial robot system according to claim 1, further comprising:
    a storage unit associating and storing
        a plurality of deviation patterns having regularity with regard to deviations, and
        operation commands of the robot respectively corresponding to the plurality of deviation patterns,
    the comparison unit comparing a program of the robot and a current situation of the robot,
    wherein
    when the comparison unit determines that the program of the robot and the current situation of the robot are different, the command output unit outputs the stop command, the deceleration command, or the deceleration stop command to the robot,
    when the deviation is between the first threshold value and a second threshold value smaller than the first threshold value, or when the deviation is larger than the first threshold value, the comparison unit compares the deviation and the plurality of deviation patterns stored in the storage unit, and
    when the comparison unit determines that the deviation includes at least one deviation pattern of the plurality of deviation patterns, the command output unit outputs, from among the operation commands stored in the storage unit and respectively corresponding to the plurality of deviation patterns, the operation command corresponding to the at least one deviation pattern included in the deviation.

5. The industrial robot system according to claim 4, wherein the plurality of deviation patterns stored in the storage unit include at least one of:
    a magnitude of the deviation,
    a time interval between two consecutive peaks of the deviation, a direction of the deviation,
a period of time in which the deviation is applied,
an amount of change of the deviation in a unit time, or
a number of times the deviation is applied within a predetermined time.

6. A control method of an industrial robot system, the method comprising:
   detecting by a force detection unit an external force applied to a robot of the industrial robot system;
   estimating, as a force estimation value, an external force applied to the force detection unit from information about an operation of the robot;
   calculating a deviation between the force estimation value and a force detection value applied to the robot obtained from information of the force detection unit;
   comparing the deviation and a first threshold value;
   when the deviation is determined to be larger than the first threshold value, outputting a retraction command, a stop command, a deceleration command, or a deceleration stop command to the robot; and
   when the deviation includes at least one deviation pattern, outputting an operation command corresponding to the at least one deviation pattern.

7. The control method according to claim 6, wherein only when the robot is at a stop or decelerating, the operation command corresponding to the at least one deviation pattern is output.

8. The control method of the industrial robot system according to claim 6, wherein
   the force detection unit includes a first force detection unit and a second force detection unit attached to the robot,
   said detecting is performed by using the first force detection unit and the second force detection unit,
   said estimating includes
      estimating, as a first force estimation value, an external force applied to the first force detection unit from the information about the operation of the robot, and
      estimating, as a second force estimation value, an external force applied to the second force detection unit from the information about the operation of the robot,
   said calculating includes
      calculating a first deviation between the first force estimation value and a first force detection value applied to the robot obtained from information of the first force detection unit, and
      calculating a second deviation between the second force estimation value and a second force detection value applied to the robot obtained from information of the second force detection unit,
   said comparing includes comparing
      the first deviation and the first threshold value,
      the second deviation and the first threshold value, and
      the second deviation and the first deviation,
   when the first deviation is determined to be larger than the first threshold value, or when the first deviation and the second deviation are determined to be different by a certain level or more, the stop command, the deceleration command, or the deceleration stop command is output to the robot, and
   when the second deviation is determined to be larger than the first threshold value, or when the second deviation and the first deviation are different by a certain level or more, the stop command, the deceleration command, or the deceleration stop command is output to the robot.

9. The control method of the industrial robot system according to claim 6, further comprising:
   associating and storing
      a plurality of deviation patterns having regularity with regard to deviations, and
      operation commands of the robot respectively corresponding to the plurality of deviation patterns; and
   comparing a program of the robot and a current situation of the robot, wherein
   when the program of the robot and the current situation of the robot are determined to be different, the stop command, the deceleration command, or the deceleration stop command is output to the robot,
   when the deviation is between the first threshold value and a second threshold value smaller than the first threshold value, or when the deviation is larger than the first threshold value, the deviation and the plurality of deviation patterns are compared, and
   when the deviation is determined to include at least one deviation pattern of the plurality of deviation patterns, from among the stored operation commands respectively corresponding to the plurality of deviation patterns, the operation command corresponding to the at least one deviation pattern included in the deviation is output.

10. The control method according to claim 9, wherein the plurality of deviation patterns include at least one of:
    a magnitude of the deviation,
    a time interval between two consecutive peaks of the deviation,
    a direction of the deviation,
    a period of time in which the deviation is applied,
    an amount of change of the deviation in a unit time, or
    a number of times the deviation is applied within a predetermined time.

* * * * *